United States Patent Office 3,129,247
Patented Apr. 14, 1964

3,129,247
CYCLOPROPYL SULFONYL UREAS
Claude I. Judd, Mequon, Wis., assignor to Lakeside
Laboratories, Inc., Milwaukee, Wis., a corporation of
Delaware
No Drawing. Filed Apr. 5, 1962, Ser. No. 185,212
6 Claims. (Cl. 260—553)

This invention relates to novel chemical compounds and processes of preparing the same. More particularly, this invention is concerned with novel cycloalkyl sulfonyl ureas, processes of producing these compounds and uses therefor.

This application is a continuation-in-part of my copending application Serial No. 42,207 filed July 12, 1960, now abandoned.

According to the present invention there are provided novel N-cycloalkyl-N'-phenylsulfonyl ureas of the formula

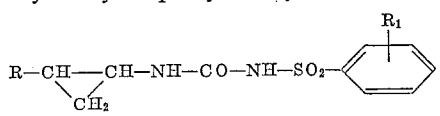

wherein R represents hydrogen, alkyl groups and particularly lower alkyl groups such as methyl, ethyl, propyl, isopropyl and butyl, aryl groups and particularly phenyl and nuclear substituted phenyl groups such as lower alkyl phenyl groups such as o-methylphenyl, lower alkoxy phenyl groups such as m-methoxyphenyl, dimethoxyphenyl and trimethoxyphenyl, lower alkylenedioxyphenyl groups such as 3,4-methylenedioxyphenyl, halophenyl groups such as o-chlorophenyl, hydroxyphenyl, aminophenyl and nitrophenyl, and aralkyl groups and particularly phenyl-lower alkyl groups such as benzyl and phenylethyl and such groups containing substituents on the phenyl ring such as specified supra for the aryl group, and $R_1$ is a member of the group consisting of hydrogen, alkyl and particularly lower alkyl groups such as methyl, ethyl and propyl, amino, nitro or a halogen such as bromine, chlorine or iodine.

The compounds of this invention, as well as novel intermediates, can be produced by reacting a cycloalkyl acid halide with an alkali metal azide to form a cycloalkyl isocyanate which is then reacted with an alkali metal salt of a benzenesulfonamide. This reaction can be represented as follows:

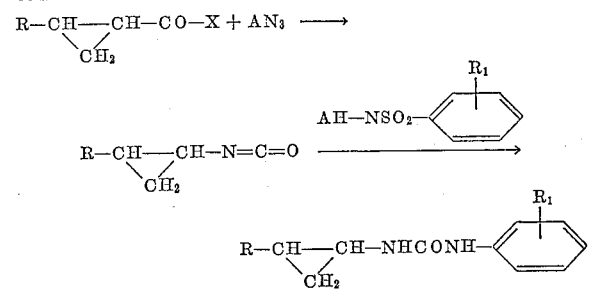

wherein X is a reactive halogen such as bromine, chlorine or iodine, A is a reactive alkali metal such as sodium or potassium, and R and $R_1$ have the significance previously assigned.

The starting acid chlorides are described in J. Chem. Soc., 159, 2620 (1956); J. Am. Chem. Soc. 81, 1660 (1959); and J. Am. Chem. Soc. 70, 2198 (1948).

Some of the cyclopropyl carboxylic acid halides that can be used in this process are:

Cyclopropyl carboxyl chloride,
2-methyl cyclopropyl carboxyl bromide,
2-ethyl cyclopropyl carboxyl bromide,
2-isopropyl cyclopropyl carboxyl chloride,
2-sec-butyl cyclopropyl carboxyl chloride,
2-benzyl cyclopropyl carboxyl chloride,
2-(o-methyl)-benzylcyclopropyl carboxyl iodide,
2-(m-methoxy)-benzylcyclopropyl carboxyl chloride,
2-(3,4-methylenedioxy)-benzylcyclopropyl carboxyl chloride,
2-(o-chloro)-benzylcyclopropyl carboxyl chloride,
2-(o-methoxy)-benzylcyclopropyl carboxyl chloride,
2-phenylcyclopropyl carboxyl chloride,
2-(o-methyl)-phenylcyclopropyl carboxyl chloride,
2-(m-methoxy)-phenylcyclopropyl carboxyl chloride,
2-(3,4-methylenedioxy)-phenylcyclopropyl carboxyl chloride,
2-(o-chloro)-phenylcyclopropyl carboxyl chloride, and
2-(o-methoxy)-phenylcyclopropyl carboxyl chloride.

The cyclopropyl acid halide and alkali metal azide can be reacted in the presence of an inert organic liquid such as toluene, xylene or cumene. Advisably, the acid halide is added to a suspension of the azide, usually sodium or potassium azide, in the reaction medium. After the addition is complete, the mixture is heated to an elevated temperature to promote the reaction. The reflux temperature is particularly suitable for this purpose. After the reaction is terminated, the reaction mixture can be filtered to remove inorganic salts. The cyclopropylisocyanate can be isolated by conventional methods if desired. However, for the purposes of this invention there is no need to do this since the filtrate containing the cyclopropylisocyanate can be reacted in the next step without prior isolation.

Some of the cyclopropylisocyanates which are produced in this way are:

Cyclopropylisocyanate,
2-methyl cyclopropylisocyanate,
2-ethyl cyclopropylisocyanate,
2-isopropyl cyclopropylisocyanate,
2-sec-butyl cyclopropylisocyanate,
2-benzyl cyclopropylisocyanate,
2-(o-methyl)-benzylcyclopropylisocyanate,
2-(m-methoxy)-benzylcyclopropylisocyanate,
2-(3,4-methylenedioxy)-benzylcyclopropylisocyanate,
2-(o-chloro)-benzylcyclopropylisocyanate,
2-phenylcyclopropylisocyanate,
2-(o-methyl)-phenylcyclopropylisocyanate,
2-(m-methoxy)-phenylcyclopropylisocyanate,
2-(3,4-methylenedioxy)-phenylcyclopropylisocyanate,
2-(o-chloro)-phenylcyclopropylisocyanate,
2-(o-methoxy)-phenylcyclopropylisocyanate,
2-(beta-phenylethyl)-cyclopropylisocyanate and
2-(gamma-phenylpropyl)-cyclopropylisocyanate.

Some of the benzenesulfonamides which can be used in the second step, in the form of an alkali metal salt, are benzenesulfonamide, p-toluenesulfonamide, sulfanilamide, p-nitrobenzenesulfonamide, p-ethylbenzenesulfonamide and p-chlorobenzenesulfonamide.

The reaction between the cyclopropylisocyanate and the salt of a benzenesulfonamide is readily effected in an inert liquid medium such as toluene, xylene and cumene. Elevated temperatures such as the reflux temperature are used to promote the reaction. After the reaction is terminated the product can be isolated by extraction with water and precipitation from the aqueous extract by the addition of acid.

Some of the cyclopropylsulfonyl ureas produced in this way are:

N-cyclopropyl-N'-p-toluenesulfonyl urea,
N-(2-methylcyclopropyl)-N'-(p-chlorophenyl)sulfonyl urea,
N-(2-ethylcyclopropyl)-N'-(p-aminophenyl)sulfonyl urea,
N-(2-isopropylcyclopropyl)-N'-(p-nitrophenyl)sulfonyl urea,
N-(2-phenylcyclopropyl)-N'-(p-toluenesulfonyl)urea,
N-(2-methylcyclopropyl)-N'-(p-toluenesulfonyl)urea,
N-[2-(R₂-phenyl)cyclopropyl]-N'-(R₃-phenylsulfonyl)-urea and
N-[2-(R₂-phenyl-lower alkyl)cyclopropyl]-N'-(R₃-phenylsulfonyl)urea wherein $R_2$ and $R_3$ represent groups such as o-methyl, m-methoxy, 3,4-methylenedioxy, o-chloro, p-hydroxy, p-amino, o-bromo, o-iodo, p-nitro, o,p-dimethoxy and 2,4,5-trimethoxy and "lower alkyl" represents groups such as methyl, ethyl and propyl.

When $R_2$ and/or $R_3$ represent amino, the compounds can be conveniently prepared by reduction of the corresponding nitro derivative utilizing standard catalytic or chemical methods.

When $R_2$ and/or $R_3$ represent hydroxyl, a suitable blocking agent such as an acyl or a benzyl group must be used to protect the hydroxyl group during formation of the acid chloride and isocyanate. These groups can be conveniently removed from the sulfonyl urea by suitable hydrolytic or reductive methods.

The compounds of this invention are anti-anginal, hypoglycemic, monoamine oxidase inhibitory and anti-bacterial agents. They thus have use in the treatment of angina pectoris, diabetes, mental depression, arthritis and infectious diseases.

The following examples are presented to illustrate the invention.

EXAMPLE 1

*2-Methylcyclopropylisocyanate*

Into a 1000 cc. 3-neck round bottom flask equipped with stirrer, reflux condenser and addition funnel is placed a suspension of 52.0 g. of sodium azide (0.8 mole) in 180 cc. of dry toluene, and the mixture warmed to 60° C. In dropwise fashion a solution of 23.7 g. of 2-methyl-cyclopropyl-1-carbonylchloride (0.2 mole) in 180 cc. of dry toluene is added. The reaction temperature is slowly raised during the addition so that the mixture is at reflux when the addition of acid chloride is complete. Refluxing is continued an additional 3 hours. The inorganic salts are filtered off and washed with toluene.

EXAMPLE 2

*2-Benzylcyclopropylisocyanate*

Into a 500 cc. 3-neck round bottom flask equipped with stirrer, reflux condenser and addition funnel is placed a suspension of 45.0 g. of sodium azide (0.69 mole) in 150 cc. of anhydrous toluene. Over a period of 2 hours a solution of 33.7 g. of 2-benzyl cyclopropyl-1-carbonyl-chloride (0.17 mole) in 125 cc. of anhydrous toluene is added in dropwise fashion at 60–65° C. The evolution of $N_2$ is apparent. Slowly (ca. 2 hrs.) the reaction temperature is raised to reflux point; refluxing is maintained for 9 hours. The inorganic salts are filtered off, washed with toluene, and the toluene distilled off under vacuum through a 10″ Vigreux column. Wt. of residue: 30.8 g. (100%). IR confirms the —N=C=O structure and the absence of

EXAMPLE 3

*N-(2-Methylcyclopropyl)-N'-(p-Toluenesulfonyl)Urea*

Into a 500 cc. 3-neck round bottom flask equipped with stirrer and reflux condenser is placed a solution of crude 2-methylcyclopropyl isocyanate (prepared from 0.21 M acid chloride as in Example 1) in 325 cc. toluene. 38.6 g. of sodium-p-toluene-sulfonamide (0.2 M) is added and the mixture heated at reflux ca 16 hours. A heavy gum separates during this procedure. The addition of 250 cc. of water dissolves the solid, and the toluene layer is separated and extracted 2×25 cc. water. The combined aqueous solutions are made strongly acid with hydrochloric acid; initially a gum separates, but this soon solidifies. The solid is recrystallized from hot aqueous isopropanol. Yield 19.1 g. (35.6%), M.P. 132–136° C.

*Anal.*—Calcd. for $C_{12}H_{16}N_2O_3S$: N, 10.44; S, 11.95. Found: N, 10.82; S, 12.00.

EXAMPLE 4

*N-Trans-(2-Phenylcyclopropyl)-N'-(p-Toluene-sulfonyl)Urea*

A 23.0 g. (0.127 mole) sample of trans-2-phenylcyclopropyl carboxylic acid chloride was converted to the isocyanate using 27 g. of sodium azide in toluene under previously described conditions. The crude isocyanate thus obtained was added to a mixture of 21.7 g. (0.127 mole) of p-toluenesulfonamide, 5.08 g. of sodium hydroxide, 70 cc. of water and 70 cc. acetone. The mixture was warmed up and after stirring for 1 hour, was diluted with water, extracted with ether and the aqueous phase acidified with concentrated hydrochloric acid. The solid was collected, dissolved in acetone and precipitated by the addition of ether. The product thus obtained was oily and weighed 28.1 g. Tituration with ether left 11.5 g. of a white crystalline solid, M.P. 162–165° C. The product was recrystallized from boiling ethanol and after drying 8.7 g. was obtained, B.P. 162–164° C.

*Anal.*—Calcd. for $C_{17}H_{18}N_2SO_3$: N, 8.47; S, 9.71. Found: N, 8.24; S, 9.67.

EXAMPLE 5

*N-(2-Benzylcyclopropyl)-N'-(p-Toluenesulfonyl)Urea*

Into a 500 cc. 3-neck round bottom flask equipped with stirrer and reflux condenser is placed a solution of 19.0 g. of crude 2-benzyl cyclopropyl-1-isocyanate (0.11 M) in ca. 150 cc. toluene. 20.1 g. of sodium-p-toluenesulfonamide (0.104 M) is added and the mixture is heated at reflux 12 hours. Upon cooling, a syrupy solid separates. 125 cc. of water is added to the mixture; the syrupy mass dissolves in the water. The toluene layer is separated and then extracted 2×25 cc. of water. The combined aqueous solutions are made strongly acid with 10% HCl; a gum separates. This gum is crystallized from hot aqueous isopropanol. The resulting solid is recrystallized from hot isopropanol. The white product is filtered off and washed with anhydrous n-hexane. M.P. 148–150° C., yield 16.6 g. (43.8%).

*Anal.*—Calcd. for $C_{18}H_{20}N_2O_3S$: N, 8.13; S, 9.31. Found: N, 8.18; S, 9.32.

Various changes and modifications of the invention can be made and, to the extent that such variations incorporate the spirit of this invention, they are intended to be included within the scope of the appended claims.

What is claimed is:
1. Compounds of the formula

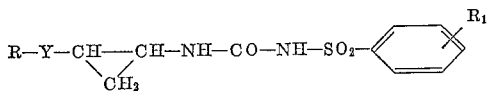

wherein R represents a member of the group consisting of phenyl, lower alkyl-phenyl, lower alkoxy-phenyl, halophenyl, hydroxyphenyl, aminophenyl, nitrophenyl, lower alkylenedioxyphenyl, Y represents a member of the group consisting of a single chemical bond and lower alkylene, and $R_1$ represents a member of the group consisting of hydrogen, lower alkyl, amino, nitro and halo groups.

2. N-(trans-2-phenylcyclopropyl) - N' - (p - toluenesulfonyl)urea.

3. N-(2-benzylcyclopropyl)-N'-(p - toluenesulfonyl)urea.

4. N-(2-phenyl-lower alkyl - cyclopropyl) - N' - (p-toluenesulfonyl)urea.

5. N-(2-phenylcyclopropyl) - N' - (phenylsulfonyl)urea.

6. N-(2-phenyl-lower alkyl-cyclopropyl)-N'-(phenylsulfonyl)urea.

References Cited in the file of this patent
UNITED STATES PATENTS

| | | |
|---|---|---|
| 2,713,591 | Bortnick | July 19, 1955 |
| 2,928,871 | Aeschlimann et al. | Mar. 15, 1960 |
| 2,962,530 | Habicht | Nov. 29, 1960 |
| 2,963,504 | Thelin et al. | Dec. 6, 1960 |

OTHER REFERENCES

Pinner: Plastics, pages 206, 208–214 (1947).
Ruschig et al.: Arzn. Forsch., volume 8, No. 7a, pages 448–454 (1958).